May 18, 1965     F. C. POLANSKI     3,183,746
TOOL HOLDERS FOR LATHES

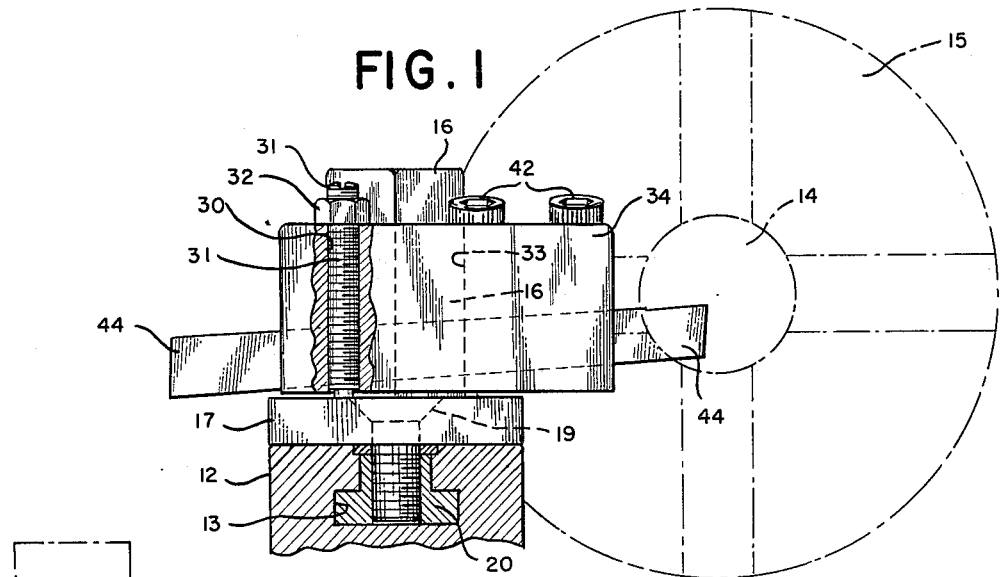
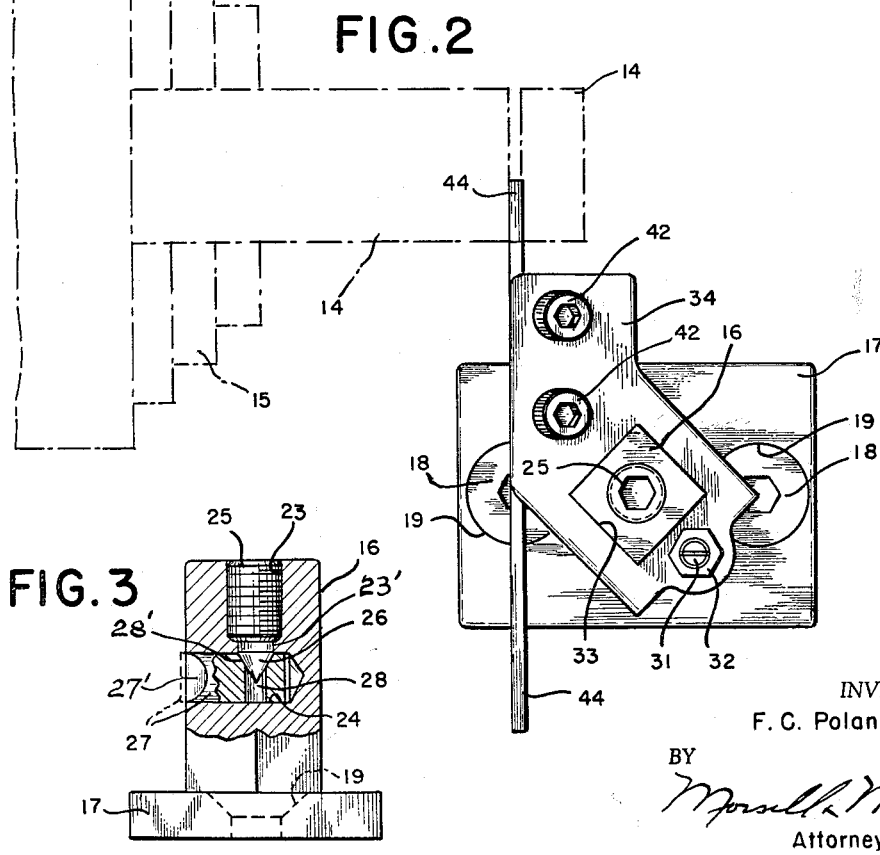

Filed May 1, 1963     2 Sheets-Sheet 2

INVENTOR.
F. C. Polanski
BY
Morsell & Morsell
Attorneys

United States Patent Office 3,183,746
Patented May 18, 1965

3,183,746
TOOL HOLDERS FOR LATHES
Frank C. Polanski, 4016 16th Ave., Kenosha, Wis.
Filed May 1, 1963, Ser. No. 277,382
5 Claims. (Cl. 82—36)

This invention relates to improvements in tool holders for lathes, and more particularly to an improved tool-holding assembly permitting various tools to be readily interchangably mounted on a lathe.

The principal object of the present invention is to provide a novel tool-holding assembly for metal-turning lathes which is so designed that the various tools commonly employed with such lathes may be interchangeably mounted thereon without disturbing the predetermined setting relative to the workpiece, thus permitting the remounting of a tool, after it has been used initially, without tediously re-aligning and re-setting the same. The importance of this feature is that it is frequently necessary to re-use the same tool during the progressive machining of a workpiece, or to similarly form a plurality of parts or pieces for a quantity production job, and with the present invention the set-up job of the operator is not only simplified, but the down time of the machine is greatly reduced, and the danger of improper resetting which might result in digging into the work, breaking of the tool bit, or spoiling of the work is eliminated.

Heretofore, special interchangable mounting assemblies have been designed to accomplish the same objective, but all of said prior devices have been relatively expensive in design and construction, and are too costly for most small tool shops and hobbyists, and with the usual type when the clamping screw is loosened, it releases all parts and disturbs the set-up.

With the above considerations in mind, a general object of the present invention is to provide an improved, quick change tool-holding assembly for lathes which is capable of maintaining its alignment with respect to the cross-feed handwheel dial setting, which includes a holder that can be removed and replaced repeatedly until the tool wears sufficiently to necessitate resharpening, the invention resulting in a material saving in time in that it reduces the need for realignment, reduces the number of cuts required, and reduces the amount of measuring time.

A more specific object of the present invention is to provide a lathe tool-mounting assembly including a plurality of individual tool holders which are interchangeably mountable on the lathe, each of said tool holders being provided with its own integral height-adjustment means which need not be altered or disturbed when said holder is removed and replaced on the lathe, thus permitting the subsequent remounting of said holder on the lathe without realigning and resetting the same.

Another object is to provide a novel assembly wherein each tool is mounted in its own holder, as described, and wherein it is unnecessary to reset the same until said tool becomes worn and in need of resharpening or replacement.

A further important object of the present invention is to provide an improved tool-holding assembly for lathes wherein the tool is always maintained securely and rigidly, and wherein there is no necessity for rockers or shims positioned beneath the tool bit, as in standard tool holders, the assembly comprising a post and a tool holder, with the latter having a square-faced internal opening for receiving the post, the opening being so arranged as to furnish rigid support against the tool tipping on the post or otherwise getting out of alignment.

Still further objects of the present invention are to provide an improved lathe tool holder assembly which is compact and has a minimum of overhang, thus providing maximum stability and eliminating vibration and chatter during operation, and which improved assembly is rugged and well adapted to withstand hard use.

With the above and other objects in view, which other objects and advantages of the present invention will become apparent hereinafter, the invention consists of the improved tool holder assembly for lathes, and all of the parts and combinations thereof, as set forth in the claims, and all equivalents thereof.

In the accompanying drawings, wherein the same reference numerals designate the same parts in all of the views:

FIG. 1 is a side elevational view of the improved assembly with parts thereof broken away and shown in section, the illustrated unit including a parting tool and its holder and the dot-and-dash lines illustrating the lathe chuck in related position;

FIG. 2 is a top plan view of the assembly shown in FIG. 1;

FIG. 3 is a side view of the novel tool post characterizing the present invention, parts thereof being broken away and shown in section;

Figure 4:
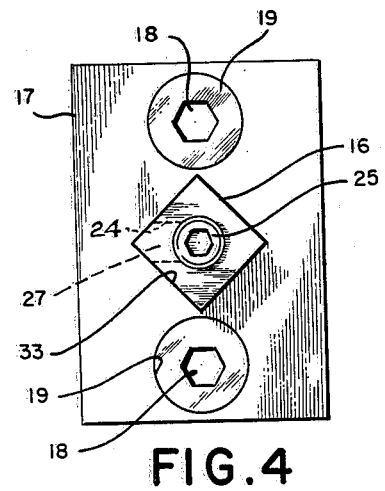
FIG. 4 is a top plan view of the tool post.

Referring now more particularly to FIGS. 1 through 4 of the drawings, the improved tool holder assembly comprising the present invention includes an upright tool post 16 rigid with a rectangular base 17 adapted to adjustably clamp to the lathe cross slide compound 12. A pair of clamping screws 18 extend downwardly through said base, and carried on the lower ends thereof are nuts 20 which fit within the conventional T-slot 13 in said lathe compound, the upper conical heads of said screws coacting with dished recesses 19 in the base surface. Said screws 18 may be turned to tightly clampingly secure said post base on the lathe, and to adjust said post it is merely necessary to loosen the said screws and to slide the unit out to a desired position in said compound slot 13. Said screws also permit removal. It will be noted in FIG. 2 that the post 16 is so positioned on the lathe that it presents one of its corners to the workpiece (said workpiece and the lathe chuck being shown in dot-and-dash lines and designated by the numerals 14 and 15, respectively). The purpose of this diagonally-disposed post arrangement is to provide maximum support against tipping or shifting of the cutting tool during operation.

Extending downwardly into the upper end of the post 16 in the present invention is a tapped bore 23 (FIG. 3), there being an untapped bore 23' of reduced diameter communicating with its lower end. Communicating with the latter intermediate the height of said post is a transverse cylindrical bore 24 which opens to the exterior at the leading corner of said post (FIG. 4). Carried within said vertical bore 23 is a screw 25 having a reduced diameter lower end with a tapered nose 26, and carried in said transverse bore 24 is a slidable wedge member 27. The latter member is provided with a small vertical bore 28 having a conical wedging recess 28' into which said tapered screw nose 26 is designed to project, and the outer end of said wedge member is V-shaped to provide opposite tapered faces 27' to press against two adjacent square interior faces of the square bore 33 of the holder as will be later described. Said member 27 is slidable in the post, and the faces 27' of its V-shaped outer end are at 90° to one another so as to be flush with the adjacent faces of the post when in the full-line position of FIG. 3, or it may be moved outwardly to project slightly beyond the post faces (as shown in exaggerated form in broken lines in FIG. 3).

In the use of the present invention, as will be hereinafter described in greater detail, the screw 25 may be turned downwardly by means of a suitable wrench to force its tapered nose 26 into the conical portion 28' of the bore 28 in said slidable member 27 and to thereby urge said member 27 outwardly to its projecting position, the purpose being to clampingly lock a tool holder on the post. When it is desired to remove the tool holder, said screw 25 may be turned upwardly again to permit said wedge member 27 to move inwardly to its retracted position, thus releasing the tool holder and permitting its withdrawal from the post. It has been found that a half turn of said screw 25 is sufficient to release or lock said member 27, and the result is a novel locking mechanism which is not only efficient and reliable, but which is quick and simple to operate.

As hereinabove mentioned, a number of individual tool holders may be utilized in the present assembly, and in addition to the parting tool and holder unit shown in the drawings (and the special thread-cutting unit illustrated in FIGS. 8–10, which will be hereinafter described), an entire set may also include an interchangeable boring bar holder, knurling tool holder, metal spinning tool rest, and various turning tools. Each of said holders is provided with clamping means adapted for its own particular tool bit, but all are basically similar in the novel manner in which they are mounted on the lathe, and they are identical in this respect to the parting tool holder 34 which will now be described.

As best appears in FIGS. 1 and 2, the tool holder 34 characterizing the present invention has a rectangular bore 33 extending vertically therethrough of a size and shape to fit the upright tool post 16, the rectangular nature of said post and holder bore preventing rotation of said holder and providing maximum rigidity. A tapped bore 30 (FIG. 1) extends completely through said holder, and threaded therethrough is a screw 31, the lower end of which is designed to abut the post base block 17 as shown.

In the use of the present assembly, the holder 34 is mounted on the tool post 16, as illustrated, and by inserting a wrench or screwdriver into the upper end of said screw 31 the latter can be turned to raise or lower said holder on said post to accurately position the same relative to the workpiece center line. A lock nut 32 is provided on the upper end of said screw 31. After the height adjustment screw 31 has been set as desired, the aforemntioned locking mechanism 25–27 within the post can be actuated to clamp the tool holder 34 on the post in said adjusted position.

To remove and replace a particular tool holder and tool on the lathe, it is merely necessary to release said tool post locking mechanism 25–27 and to manually lift the holder 34 from said post, leaving said height adjustment screw 31 and the base of the post in previously set position. If it should be desired to use the same tool of the workpiece at a later time, or to use said tool on a duplicate part, the tool and its holder can again be slipped onto the post 16 and lowered thereon until said screw 31 abuts the post base 17, and it is not necessary to again adjust and set said holder relative to the workpiece. The result is that the job of the operator is greatly simplified and the down time of the machine is minimized.

All of the individual tool holders utilized in the present assembly are the same in the manner in which they are mounted on the supporting post 16, but each is provided with tool-holding or clamping means adapted for its particular tool bit, as mentioned. Most of said bit-clamping mechanisms are conventional in design and operation and said holders have not, therefore, been shown herein, but the illustrated parting tool holder 34 is novel in this respect, as will now be described.

Figure 5:
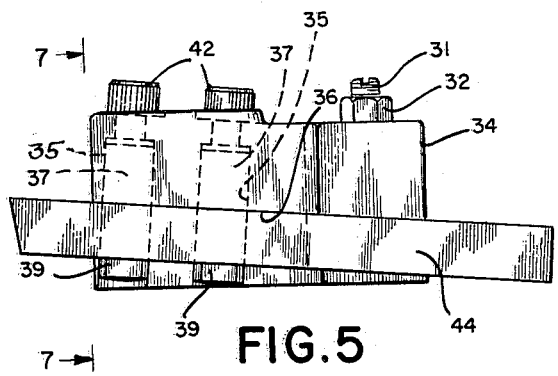
FIG. 5 is an elevational view of the parting tool and holder showing the opposite side from that illustrated in FIG. 1.
Figure 7:
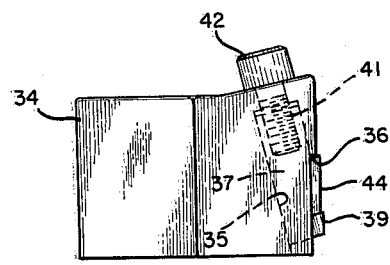
FIG. 7 is an end view, looking inwardly as indicated by the line 7—7 of FIG. 5.
Figure 6:
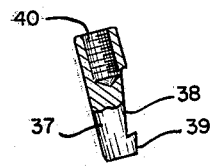
FIG. 6 is a view of the tool clamping screw removed, part thereof being broken away and shown in section.

As best appears in FIGS. 5 and 7, the parting tool holder 34 is provided with a pair of bores 35 which angle downwardly to open in the front face of said holder, and the latter face is provided with a recessed elongated cutout, the upper margin of which provides a downwardly-facing, longitudinal shoulder 36. Movably carried in each of said bores 35 is a tool-holding pin 37 (FIG. 6), having a tapped bore 40 in the top for an adjustment screw 41 (FIG. 7). The knurled heads 42 of said screws act against the top of the holder 34. With reference again to FIG. 6, each of said pins 37 is provided with a transverse cutout 38 in its lower portion providing a straight, blade-receiving recess of greater width than the cutting blade 44, the lower margin of which forms a lower lip or shoulder 39.

When a parting blade 44 is to be mounted in said holder 34, the screws 41 are loosened by the operator to permit the positioning of said blade 44 in the aligned recesses 38 in the pins 37, said recesses being wider than said blade, and said screws 41 are then tightened to draw up said pins to firmly clamp said blade between the pin lips 39 and the shoulder 36 thereabove on the holder. Thus there is provided a simple but effective mechanism whereby the elongated parting blade 44 may be quickly and easily removably mounted in the holder 34 and whereby said blade cannot tilt or shift during the cutting operation, as sometimes occurs with conventional parting tool holders.

Figure 9:
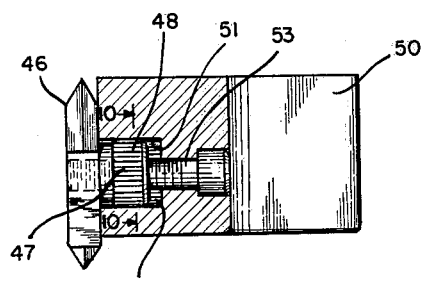
FIG. 9 is a sectional view of said threading tool assembly, taken along line 9—9 of FIG. 8.
Figure 8:
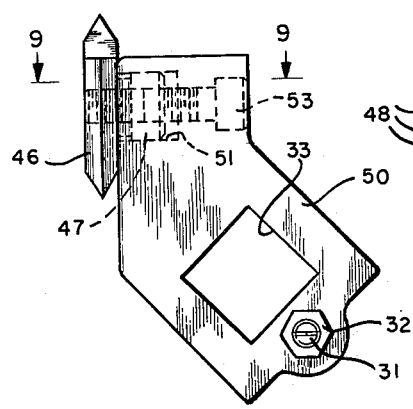
FIG. 8 is a top plan view of a threading tool and its holder which may be utilized in conjunction with the present invention.
Figure 10:
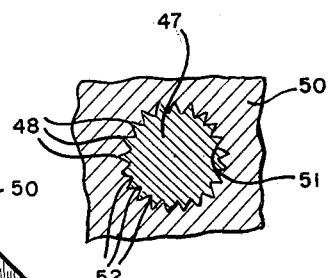
FIG. 10 is an enlarged fragmentary sectional view through a part of said threading tool assembly, taken along line 10—10 of FIG. 9.

In FIGS. 8–10 of the drawing there is shown a threading tool and holder unit which may be utilized in connection with the present invention. The present threading blade 46 is circular in form, thus permitting said blade to be rotated to bring another part of its periphery into engagement with the workpiece as said blade becomes worn and thereby prolonging the useful life of said blade. In the present assembly the mounting arrangement, whereby said blade can be readily shifted within the holder is novel. In this respect, the holder 50 is provided with a bore 51 having longitudinal serrations 52, and said circular threading tool is provided with a stem portion having an enlarged head 47 with serrations 48 which fit the holder serrations 52. Said stem portion is also provided with a tapped longitudinal bore and threaded therein is a clamping screw 53.

When said threading tool 46 is to be mounted in its holder, the tool stem 47 is inserted into the holder bore 51, the serrations 48 on said head portion fitting within the holder serrations 52, and the screw 53 is adjusted to lock the same therein. When it is desired to shift the position of said threading blade, said screw 53 may be disengaged therefrom and the tool stem 47 pulled outwardly from the holder. The blade is then rotatably indexed one or more serrations and the retaining screw 53 is again threaded therein. Thus there is provided a mounting arrangement whereby the threading tool can be quickly and easily shifted to bring a new portion of its cutting edge into cutting position and wherein said tool is firmly and securely retained in place and cannot shift during operation.

As mentioned, it is to be clearly understood that the present invention is by no means to be limited to use with the two types of metal-working tools illustrated in the drawings, a typical assembly also including all of the other tools commonly utilized with a metal turning lathe. To mount any of said tools on a lathe, the operator first makes sure that the locking mechanism 25–27 in the tool post 16 is in its retracted position, and he slips the holder of the tool he intends to use onto said post. He may then adjust the vertical setting of the tool on the post by turning the screw 31 upwardly or downwardly to raise or lower the holder, and by turning the nut 32 thereon he may lock said screw in its adjusted position. The holder is then locked on the post by turning the internal locking mechanism 25–27, and the lathe is ready for use.

After the operator has completed a particular cutting or forming operation and it is desired to use another tool on the workpiece, he may remove the first tool merely by retracting the post-locking mechanism 25–27 and slipping the holder upwardly off the post. Unlike conventional mounting assemblies, with the present structure the removal and replacement of the tool does not require the release or adjustment of the holder height-adjustment means 31, or is it necessary to separate the tool from its holder. After the holder has been withdrawn from the post, a new tool and its holder can be slipped onto said upright post and adjusted to set in the same manner.

When it is necessary to again use the first tool on the workpiece, or on a duplicate workpiece, the first tool holder can again be slipped onto the post and lowered thereon until the previously-set height adjustment screw 31 abuts the post base 17, and the tool is thus automatically accurately repositioned relative to the workpiece. The result is that it is unnecessary to tediously realign and reset said tool.

A further important advantage of the present assembly is that the mounting of the holder in closely surrounding relationship to the rectangular upright post 16 provides an extremely rigid mounting, and the possibility of the tool becoming inadvertently misaligned during operation is eliminated. Moreover, in the present structure there is a minimum of overhang and there is relatively little chattering or vibration during operation.

From the foregoing it will be seen that the present invention provides a novel tool holder assembly for lathes which is a definite improvement over conventional structures. Moreover, and of great importance, the present simplified assembly is substantially less expensive in design and construction than the special devices heretofore designed to accomplish the same objectives.

It is to be understood, of course, that various modifications or changes may be made in the assembly hereinabove described without departing from the spirit of the invention, and all of such changes or modifications are contemplated as may come within the scope of the following claims.

What I claim is:

1. In a tool-holding assembly for a lathe, said assembly having a base with means for adjustably clamping said base to the lathe bed, a post rigid with said base and projecting upwardly therefrom, said post being of rectangular cross-section and having a transverse bore intermediate its length and having a longitudinal bore communicating with said transverse bore, said longitudinal bore having an outer threaded portion communicating with the upper end of the post, a tool holder having a rectangular internal opening therethrough to snugly and slidably receive said post, said tool holder surrounding said post, set screw means between said tool holder and base for adjusting the height of the tool holder on said post to a predetermined position, a locking pin slidable in said transverse bore of the post, and an actuating screw threaded in the threaded portion of the longitudinal bore of the post, there being means between the lower end of said actuating screw and said pin for causing outward locking movement of the latter when the actuating means is adjusted inwardly.

2. In a tool-holding assembly for a lathe, said assembly having a base with means for adjustably clamping said base to the lathe bed, a post rigid with said base and projecting upwardly therefrom, said post being of rectangular cross-section and having a transverse bore intermediate its length and having a longitudinal bore communicating with said transverse bore, said longitudinal bore having an outer threaded portion communicating with the upper end of the post, a tool holder having a rectangular internal opening therethrough to snugly and slidably receive said post, said tool holder surrounding said post, set screw means between said tool holder and base for adjusting the height of the tool holder on said post to a predetermined position, a locking pin slidable in said transverse bore of the post, and an actuating screw threaded in the threaded portion of the longitudinal bore of the post, there being wedge means between the lower end of said actuating screw and said pin for causing outward locking movement of the latter when the actuating means is adjusted inwardly.

3. In a tool-holding assembly for a lathe, said assembly having a base with means for adjustably clamping said base to the lathe bed, a post rigid with said base and projecting upwardly therefrom, said post being of rectangular cross-section and having a transverse bore intermediate its length and having a longitudinal bore communicating with said transverse bore, said longitudinal bore having an outer threaded portion communicating with the upper end of the post, a tool holder having a rectangular interior opening to snugly and slidably receive said post, said tool holder surrounding said post, set screw means between said tool holder and base for adjusting the height of the tool holder on said post to a predetermined position, a locking pin slidable in said transverse bore of the post, and an actuating screw threaded in the threaded portion of the longitudinal bore of the post and having a tapered lower end, there being a conical recess in said pin positioned to be engaged by the tapered lower end of said actuating screw for causing outward movement of the pin when the actuating screw is adjusted inwardly.

4. A tool-holding assembly as recited in claim 1 and wherein said tool holder has an external longitudinal slot in one side with an upper margin forming a tool-holding lip, at least one transverse bore in said holder communicating with said slot, a locking pin for each transverse bore, each pin having a transverse blade-receiving recess with a lower lip, and screw means between said holder and locking pin for adjusting the latter to move the lip of the pin toward and away from the lip of the holder whereby an elongated tool may be detachably held in a longitudinally adjusted position in the slot of the holder.

5. A tool-holding assembly as recited in claim 1 and wherein said tool holder has a tool-holding portion with a serrated bore, a circular thread-cutting tool having a serrated stem to fit said serrated bore whereby the thread-cutting tool may be maintained by cooperating serrations in a selected position of rotatable adjustment, and bolt means in said holder coacting with said stem for detachably holding the stem and thread cutter against withdrawal from the bore.

References Cited by the Examiner

UNITED STATES PATENTS

| 280,147 | 6/83 | Douglas | 29—102 |
| 680,425 | 8/01 | Breitfield | 82—37 |
| 1,380,317 | 5/21 | Gustafson | 82—36 X |

FOREIGN PATENTS

| 1,000,881 | 10/51 | France. |
| 1,052,998 | 9/53 | France. |
| 1,069,986 | 11/59 | Germany. |

OTHER REFERENCES

Schoeberl: German application Serial No. Sch 11827 Ib/49a, printed May 24, 1956 (kl. 49a 3401).

WILLIAM D. DYER, Jr., *Primary Examiner.*